(12) United States Patent
Tutsch

(10) Patent No.: US 10,471,390 B1
(45) Date of Patent: Nov. 12, 2019

(54) PUMP-ASSISTED WATER FILTRATION SYSTEM

(71) Applicant: Christopher D. Tutsch, North Port, FL (US)

(72) Inventor: Christopher D. Tutsch, North Port, FL (US)

( * ) Notice: Subject to any disclaimer, the term of this patent is extended or adjusted under 35 U.S.C. 154(b) by 207 days.

(21) Appl. No.: 15/707,015

(22) Filed: Sep. 18, 2017

(51) Int. Cl.
*B01D 61/08* (2006.01)
*B01D 35/143* (2006.01)
*B01D 35/26* (2006.01)
*B01D 24/00* (2006.01)
*C02F 1/44* (2006.01)
*B01D 29/60* (2006.01)

(52) U.S. Cl.
CPC ............. *B01D 61/08* (2013.01); *B01D 23/26* (2013.01); *B01D 29/60* (2013.01); *B01D 35/143* (2013.01); *B01D 35/26* (2013.01); *C02F 1/441* (2013.01); *B01D 2313/06* (2013.01); *B01D 2313/21* (2013.01); *C02F 2209/03* (2013.01); *C02F 2209/40* (2013.01); *C02F 2209/42* (2013.01); *C02F 2307/10* (2013.01)

(58) Field of Classification Search
CPC .... B01D 61/08; B01D 61/12; B01D 2313/06; B01D 2313/21; C02F 1/441; C02F 2209/40; C02F 2209/03; C02F 2209/42; C02F 2307/10
See application file for complete search history.

(56) References Cited

U.S. PATENT DOCUMENTS

| | | | | |
|---|---|---|---|---|
| 4,629,568 A | * | 12/1986 | Ellis, III | B01D 61/08 210/136 |
| 5,766,453 A | * | 6/1998 | Morellato | B01D 61/08 141/360 |
| 5,824,215 A | * | 10/1998 | Suh | B01D 61/08 210/249 |
| 6,120,682 A | * | 9/2000 | Cook | B01D 61/08 210/232 |
| 6,391,184 B1 | | 5/2002 | Orolin et al. | |
| 6,521,124 B2 | | 2/2003 | Northcut et al. | |
| 6,547,965 B1 | | 4/2003 | Chancellor | |
| 7,017,611 B2 | | 3/2006 | Schmitt | |
| 8,883,006 B2 | | 11/2014 | Kovach et al. | |
| 9,114,365 B2 | | 8/2015 | Schmitt | |
| 9,371,245 B2 | | 6/2016 | Burrows | |
| 2015/0151998 A1 | | 6/2015 | Stevenson et al. | |

* cited by examiner

*Primary Examiner* — Terry K Cecil
(74) *Attorney, Agent, or Firm* — Goldstein Law Offices, P.C.

(57) ABSTRACT

A pump assisted water filtration system comprising a filter assembly, a pump assembly, and a water storage tank, which produces purified water through a reverse osmosis process and stores the purified water for later use. The pump assembly receives water from a water source and delivers pressurized water to the filter assembly. The filter assembly is configured to filter the impurities within the water, producing purified water which is collected in the water storage tank. A water flow interrupt permits the flow of water to the pump when the water level falls within the water storage tank, and blocks the flow of water to the pump when the water storage tank is full. The pump is further configured to activate when the pressure of the water flowing to the pump reaches a pump activation threshold, and deactivate when the pressure of the water falls below the pump activation threshold.

2 Claims, 6 Drawing Sheets

PUMP-ASSISTED WATER FILTRATION SYSTEM

TECHNICAL FIELD

The present disclosure relates generally to a water filtration system. More particularly, the present disclosure relates to a water filtration system configured with a membrane filter which receives and filters pressurized water from a pump, and produces purified water which is stored by the system for later use.

BACKGROUND

There are many domestic and commercial water filtration systems in use, ranging from small filtration units that connect to a faucet, to complex filtration systems functioning at the level of water mains. These systems often incorporate membrane filters operating on the principle of reverse osmosis where water passes through a membrane which excludes impurities within the water while allowing the water to pass through. Reverse osmosis filters are highly effective and enjoy wide popularity, but the process has several inherent disadvantages that many filtration systems have difficulty addressing.

In order for water to pass through the many membrane layers found inside membrane filters in sufficient volume, the water must be pressurized. Unfortunately, the water sources which filtration systems draw water from often provide water at pressures insufficient for effective reverse osmosis filtration. Some reverse osmosis filtration systems incorporate pumps to force water through the membrane filters, but these systems are incapable of producing purified water if the pump ceases to operate. Furthermore, the rate by which purified water is produced is often insufficient to keep up with the rate of water consumption. Reverse osmosis membranes are also subject to clogging as impurities accumulate within the filter. Some systems seek to prevent clogging by flushing the impurities from the filter using water, but the flushing process can result in significant inefficiency if a system produces too much waste water in proportion to purified water.

Therefore, there is a need for a water filtration system which addresses the disadvantages inherent in the reverse osmosis process through improved pump, filtration, and water storage mechanisms.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a pump assisted water filtration system which produces purified water and stores the purified water for later use. Accordingly, the present disclosure provides a pump assisted water filtration system which receives water from a water source via a water inlet and comprises a filter assembly configured to filter impurities within the water and produce purified water, a pump assembly which receives the water from the inlet conduit and is configured to pump the water to the filter assembly via a pump discharge conduit, and a water storage tank configured to receive and store the purified water produced by the filter assembly.

It is a further aspect of an example embodiment in the present disclosure to provide a pump assisted water filtration system which filters water through a reverse osmosis process. Accordingly, the pump assembly further comprises a pump assembly housing enclosing a pump configured to deliver pressurized water to the filter assembly via a filter assembly inlet. The filter assembly further comprises a filter assembly housing enclosing a membrane filter configured to filter the impurities within the water flowing into the filter assembly housing, causing purified water to flow from the filter assembly via a filter assembly water outlet.

It is another aspect of an example embodiment in the present disclosure to provide a pump assisted water filtration system which is configured to produce purified water in response to a fall in the water level within the water storage tank. Accordingly, the water storage tank is configured with a tank control switch configured to disengage when the water storage tank is full and engage when the water level in the water storage tank falls. When the tank level control switch is disengaged, a water flow interrupt disposed along the inlet conduit is closed and cuts off the flow of the water to the pump assembly. When the tank level control switch is engaged, the water flow interrupt is opened and allows the water to flow to the pump assembly.

It is yet another aspect of an example embodiment in the present disclosure to provide a pump assisted water filtration system which is configured to activate the pump in response to water flowing through the inlet conduit to the pump assembly. Accordingly, a low pressure cutoff is positioned and configured to measure the pressure of the water flowing through the inlet conduit and into the pump assembly. The low pressure cutoff is further configured to activate the pump when the water pressure of the water reaches a pump activation threshold, and deactivate the pump when the water pressure falls below the pump activation threshold.

It is still yet another aspect of an example embodiment in the present disclosure to provide a pump assisted water filtration system which is configured to filter particulate matter from the water flowing through the inlet conduit to the pump assembly. Accordingly, the pump assisted water filtration system can further comprise a first filter disposed along the inlet conduit which is configured to filter particulate matter which may damage the pump or the membrane filter.

It is a further aspect of an example embodiment in the present disclosure to provide a pump assisted water filtration system which is configured to flush out the impurities filtered by the membrane filter. Accordingly, the filter assembly is configured to flush the impurities filtered by membrane filter via a flow of waste water which exits the filter assembly via a filter assembly waste outlet. The pump assisted water filtration system is further configured to regulate the proportion of the waste water produced by the filter assembly in relation to the purified water produced by the filter assembly. Accordingly, the pump assisted water filtration system further comprises a drain valve which increases or decreases the flow of waste water in proportion to the flow of purified water by regulating the back pressure within a waste water conduit connected to the filter assembly waste outlet.

It is yet a further aspect of an exemplary embodiment in the present disclosure to provide a pump assisted water filtration system capable of producing purified water when the pump is inactive. Accordingly, the pump assembly may be configured to allow the water from the inlet conduit to flow through the pump and pump assembly to reach the filter assembly when the pump is inactive.

It is still a further aspect of an exemplary embodiment in the present disclosure to provide a pump assisted water filtration system that produces purified water on demand. Accordingly, the pump assisted water filtration system can be configured with a manual or automatic flow control switch which engages and disengages the water flow interrupt, and the purified water may be transported from the filter assembly water outlet to a water consumption point.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
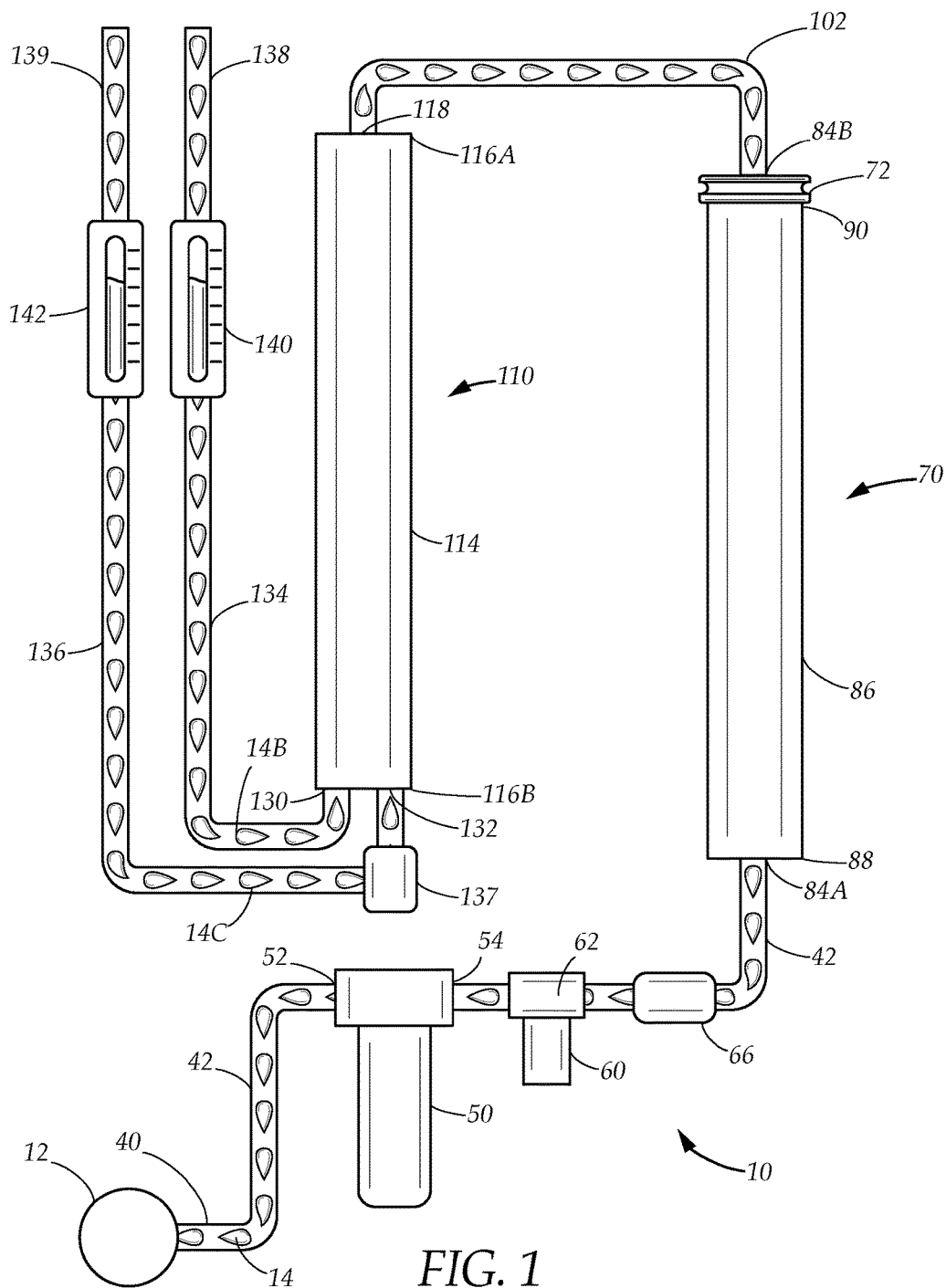
FIG. 1 is a schematic diagram showing the flow of water through an embodiment of a pump assisted water filtration system in accordance with the present disclosure.

FIG. 1 depicts an embodiment of a pump assisted water filtration system 10 comprising a filter assembly 110 configured to filter impurities in water 14 flowing into the system 10 from a water source 12, and a pump assembly 70 connected to the filter assembly 110 via a pump assembly discharge conduit 102, where the pump assembly 70 is configured to pressurize the water flowing to the filter assembly 110. The filter assembly 110 comprises a filter assembly housing 114 having a filter assembly housing upstream end 116A and a filter assembly housing downstream end 116B. The filter assembly housing 114 may contain a membrane filter configured to filter impurities in the water flowing into the filter assembly 110 by causing the water to pass through a plurality of membrane layers in a reverse osmosis process before exiting the filter assembly through a filter assembly water outlet 130 as a flow of purified water 14B. Reverse osmosis membrane filters operate more effectively with pressurized water, and the pump assembly 70 is therefore configured with a pump powered by a motor which pressurizes the water flowing into the pump assisted water filtration system, thus delivering pressurized water to the filter assembly 110 to ensure optimal filtration performance.

Water 14 from the water source 12 flows through a water inlet 40, and is transported to the pump assisted water filtration system 10 via an inlet conduit 42. The water source 12 can be any residential or commercial water source such as a water main, a municipal water supply, or a well. The pump assisted water filtration system 10 may further comprise a first filter 50 disposed along the inlet conduit 42 which is configured to filter out sediment and particulate matter which may be present in the water and which could interfere with the operation of the pump assembly 70 or otherwise clog the membrane filter. The first filter 50 may be implemented as a poly sediment filter placed in series with the inlet conduit 42, with the water flowing into the first filter 50 via a first filter inlet 52 and exiting the first filter 50 via a first filter outlet 54. Other types of filters suitable for excluding sediment and particulate matter may be substituted, as can be appreciated by a person of ordinary skill in the art in the field of the invention.

The pump assisted water filtration system may further comprise a solenoid valve 60 disposed along the inlet conduit 42. In an embodiment where the first filter 50 is present, the solenoid valve 60 may be configured along the inlet conduit 42 in series with, and downstream from, the first filter 50. The solenoid valve 60 may be set to a closed state when at rest to prevent water from flowing through the solenoid valve 60, creating a water flow interrupt 62 which blocks the water from flowing further into the pump assisted water filtration system 10. The solenoid valve 60 enters an open state when engaged, and allows water to flow past the water flow interrupt 62. Other types of valves may be employed in place of a solenoid valve, such as a motorized valve or other suitable apparatus as will be apparent to a person of ordinary skill in the art in the field of the invention. The solenoid valve 60 can be engaged and set to the open state to allow water to flow through the inlet conduit 42 and into the pump assembly 70 via a pump assembly inlet 84A. In a preferred embodiment, a water storage tank serves as a reservoir which stores the purified water produced by the pump assisted water filtration system 10. The purified water can be removed from the water storage tank as needed for consumption, redistribution, or use in an activity utilizing clean water. As the purified water is used or otherwise transported out of the water storage tank, the water level in the water storage tank falls. The water storage tank may be configured with a tank level control switch which detects the falling water level and causes the solenoid valve 60 to engage and enter an open state, thus allowing water to flow past the water flow interrupt 62. When the water level in the water storage tank rises and the water storage tank is full, the tank level control switch may cause the solenoid valve 60 to disengage and enter a closed state, restoring the water flow interrupt 62.

The pump assisted water filtration system 10 may further comprise a low pressure cutoff 66 located along the inlet conduit 42 between the solenoid valve 60 and the pump assembly 70. The low pressure cutoff 66 may be implemented as a pressure switch configured to enter a closed state once the pressure of the water flowing through the low pressure cutoff 66 meets or exceeds a pump activation threshold, which can be expressed as pounds per square inch or psi. The low pressure cutoff 66, upon entering the closed state, may be configured to activate the motor within the pump assembly 70. The low pressure cutoff 66 therefore may prevent the pump from being activated when there is insufficient water flowing through the inlet conduit 42. The pump activation threshold may also be set so that the low pressure cutoff 66 will engage only when the pressure of the water within the inlet conduit 42 is sufficient for the pump within the pump assembly 70 to operate properly, avoiding potential damage to the pump due to cavitation. For example, the pump activation threshold may be set to 15 psi. When the pressure of the water within the inlet conduit 42 falls below the pump activation threshold, the low pressure cutoff 66 will disengage and enter an open state, which in turn deactivates the pump.

The pump assembly 70 may comprise a pump assembly housing 86 with a pump assembly housing upstream end 88 and a pump assembly housing downstream end 90. The pump assembly 70 may be connected to the inlet conduit 42 via a pump assembly inlet 84A disposed on the pump assembly housing upstream end 88, allowing water to flow into the pump assembly housing 86. The pump and the motor which powers the pump can be disposed within the pump assembly housing 86, so that the pump, when activated, pressurizes the water within the pump assembly housing 86 and causes a flow of pressurized water to be discharged from the pump assembly 70 through a pump assembly outlet 84B on the pump assembly housing downstream end 90, and into the pump assembly discharge conduit 102. The pump assembly 70 can be configured to produce water at a pressure which allows the membrane filter within the filter assembly 110 to operate at optimal efficiency. In some embodiments, the pump assembly 70 produces water at a pressure of between 80 to 120 psi.

In some embodiments, the pump assembly housing 86 may be configured as a tube, where the pump assembly housing upstream end 88 and pump assembly housing downstream end 90 can each form an end of the tube, which can be either open or closed. A pump assembly cap 72 can be configured to seal each open end of the pump assembly housing 86. The pump assembly cap 72 may be further configured to allow the pump assembly inlet 84A or the pump assembly outlet 84B to pass through the pump assembly cap 72, enabling the pump assembly cap 72 to connect to the inlet conduit 42 or the pump discharge conduit 102. In one embodiment, water is capable of passing through the pump assembly 70 and into the pump discharge conduit 102 even when the pump is not activated.

The pump discharge conduit 102 carries water from the pump assembly 70 to the filter assembly 110. The pump discharge conduit 102 may be connected to a filter assembly inlet 118 disposed on the filter assembly housing upstream end 116A. When the pump within the pump assembly 70 is activated, pressurized water flows through the pump discharge conduit 102 and into the filter assembly 110. Purified water 14B may exit the filter assembly through a filter assembly water outlet 130 disposed on the filter assembly housing downstream end 116B, and into a filtered water conduit 134. The filtered water conduit 134 may then transport the purified water 14B to a filtered water outlet 138. In a preferred embodiment, the filtered water outlet 138 transports the purified water 14B into the water storage tank. In other embodiments, a second filter may be placed along the filtered water conduit 134 to further purify the water flowing from the filtered water outlet 138. The second filter may be configured to complement the filter assembly 110 by excluding impurities that the filter assembly 110 is not configured to purify, adjust the pH level of the water, or perform another water filtration role as will be appreciated by a person of ordinary skill in the art in the field of the invention.

The filter assembly may further be configured to separate waste water 14C from the purified water, by channeling waste water 14C through a filter assembly waste outlet 132 configured in the filter assembly housing downstream end 116B and into a waste water conduit 136. The waste water 14C contains impurities filtered out by the membrane filter, and directing the waste water 14C out of the filter assembly 110 allows the impurities to be flushed from the membrane filter. The waste water conduit 136 may then transport the waste water 14C to a waste water outlet 139, where the waste water can be transported for disposal in a sewage drain or be otherwise redirected.

The filter assembly 110 may be configured with a drain valve 137 which regulates a flow ratio between purified water 14B and waste water 14C passing through the filter assembly 110. By increasing the flow of waste water 14C in relation to the flow of purified water 14B, the impurities excluded by the membrane filter can be flushed out of the filter assembly 110. Decreasing the flow of waste water 14C in relation to the flow of purified water 14B may result in the buildup of impurities within the filter assembly, but economizes the overall use of water by the pump assisted water filtration system 10. The drain valve 137 may be implemented using a back pressure regulator disposed between the filter assembly waste outlet 132 and the waste water conduit 136 which can increase or decrease the flow of the waste water 14C exiting the filter assembly 110 in relation to the flow of purified water 14B. The pump assisted water filtration system 10 can further comprise one or more flow gauges configured to measure and display the flow rate of the water exiting the filter assembly 110. A filtered water flow gauge 140 may be disposed along the filtered water conduit 134, while a waste water flow gauge 142 may be positioned along the waste water conduit 136. By monitoring the flow rate through the filtered water conduit 134 and the waste water conduit 136 while adjusting the drain valve 137, the user can manage the flow ratio between purified water 14B and waste water 14C to balance the production of purified water 14B against the loss of water through the flushing of impurities. For example, a flow ratio of one part purified water 14B to three parts waste water 14C may be used. Other flow ratios may be employed by taking into account the efficiency of the type of membrane filter employed, the amount of impurities in the water source 12, the pressure of the water flowing into the filter assembly 110 from the pump assembly 70, or other relevant factors as will be apparent to a person of ordinary skill in the art in the field of the invention.

Figure 2:
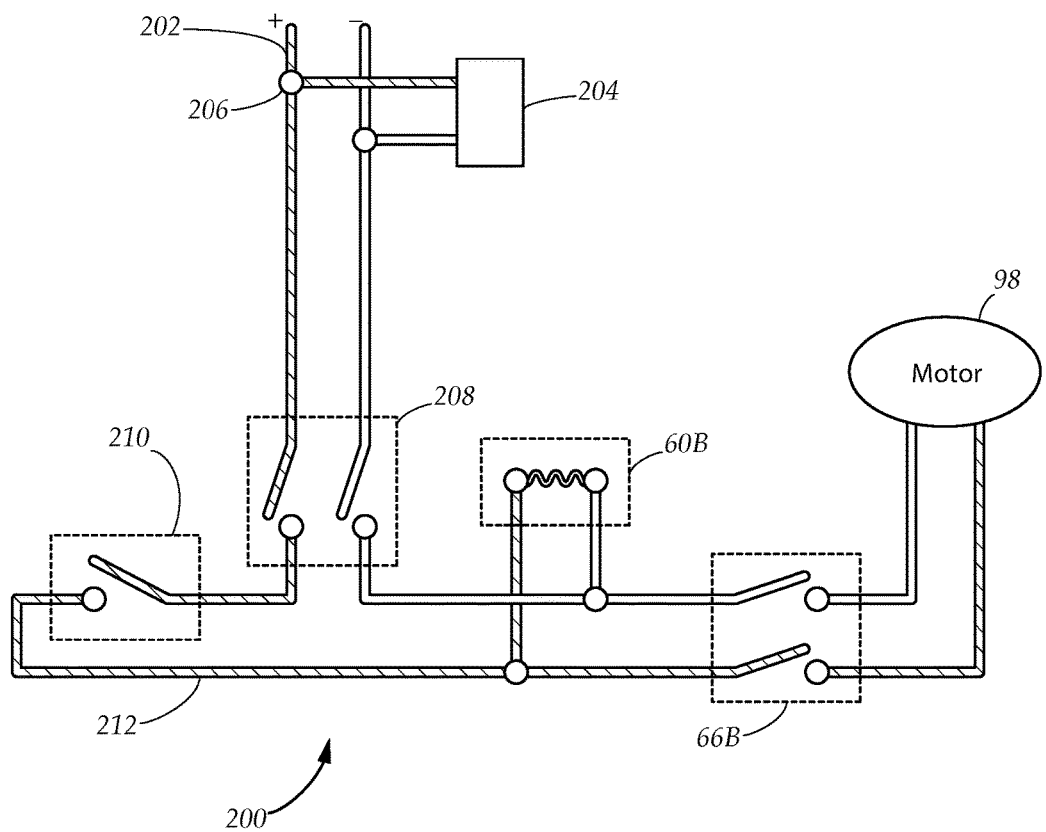
FIG. 2 is a circuit diagram depicting an exemplary system control circuit which governs the operation of the pump assisted water filtration system, in accordance with an embodiment of the present disclosure.

FIG. 2 is a circuit diagram depicting a system control circuit 200 which governs the operation of the pump assisted water filtration system. The system control circuit 200 is connected to a power input 202 via a master power connection 206, and the components of the system control circuit 200 are linked through electrical wiring 212. The power input 202 is a source of electric current such as the electrical power system of a building, and the master power connection 206 comprises an electrical connector which delivers electric current from the power input 202 to the system control circuit 200. The system control circuit 200 may have a battery 204 which serves as an alternative source of current if the power input 202 is interrupted, such as in the event of a power outage. The system control circuit 200 may further have a main power switch 208 which can be engaged or disengaged to control the flow of electrical current through the system control circuit 200.

The system control circuit 200 may include the tank level control switch 210 configured within the water storage tank, which can be configured to control the flow of current through the system control circuit 200 by engaging when there is a need for the pump assisted water filtration system to produce purified water. The tank level control switch 210 may be implemented as a float switch within the water storage tank which engages when the water level falls as water exits the tank, and disengages when the tank is full. A person of ordinary skill in the art in the field of the invention will appreciate that other types of sensors and switches may be employed in place of a float switch to detect the rise and fall of the water level within the water storage tank. The tank level control switch may be further configured to engage only when the water level falls past a certain point, such as a point representing fifty percent of the water storage tank's capacity, to prevent the pump assisted water filtration system from operating too often. Referring simultaneously to FIGS. 1 and 2, the system control circuit 200 may also include a solenoid driver 60B which controls the solenoid valve 60. When the water level falls and the tank level control switch 210 is engaged, the system control circuit 200 delivers current to the solenoid driver 60B, which causes the solenoid valve 60 to enter an open state, allowing water to flow through the inlet conduit 42. When the water storage tank is full and the tank level control switch 210 is disengaged, the flow of current through the solenoid driver 60B stops, causing the solenoid valve 60 to enter a closed state. The system control circuit 200 may be further connected to the motor 98 which powers the pump within the pump assembly 70. When the tank level control switch 210 is engaged, current flows through the system control circuit 200, causing the motor 98 to activate and power the pump within the pump assembly 70. When the tank level control switch 210 is disengaged, the current is interrupted and the motor 98 deactivates. A flow control switch may be employed to control the flow of current to the solenoid driver 60B, such as in an alternate embodiment where the water storage tank is not used with the system 10, where the filtered water outlet 138 instead transports the purified water to a water consumption point such as a faucet or other destination where purified water is required or utilized. The flow control switch can be engaged or disengaged manually or automatically, in response to a need for the production of purified water. Continuing to refer to FIGS. 1 and 2, the system control circuit 200 may further be connected to a pressure switch 66B which operates the low pressure cutoff 66. When the pressure of the water flowing through the pressure switch 66B meets or exceeds the pump activation threshold, the low pressure cutoff is engaged, allowing current to flow to the motor 98 and causing it to activate. When the pressure switch 66B detects that the pressure of the water has fallen below the pump activation threshold, the low pressure cutoff 66 disengages and cuts the flow of current to the motor 98, causing the motor to deactivate. The arrangement of sensors and switches described above is not intended to be limiting, and it will be apparent to a person of ordinary skill in the art in the field of the invention that sensors and switches other than the types described may be employed while adhering to the principles of the present disclosure.

Figure 3:
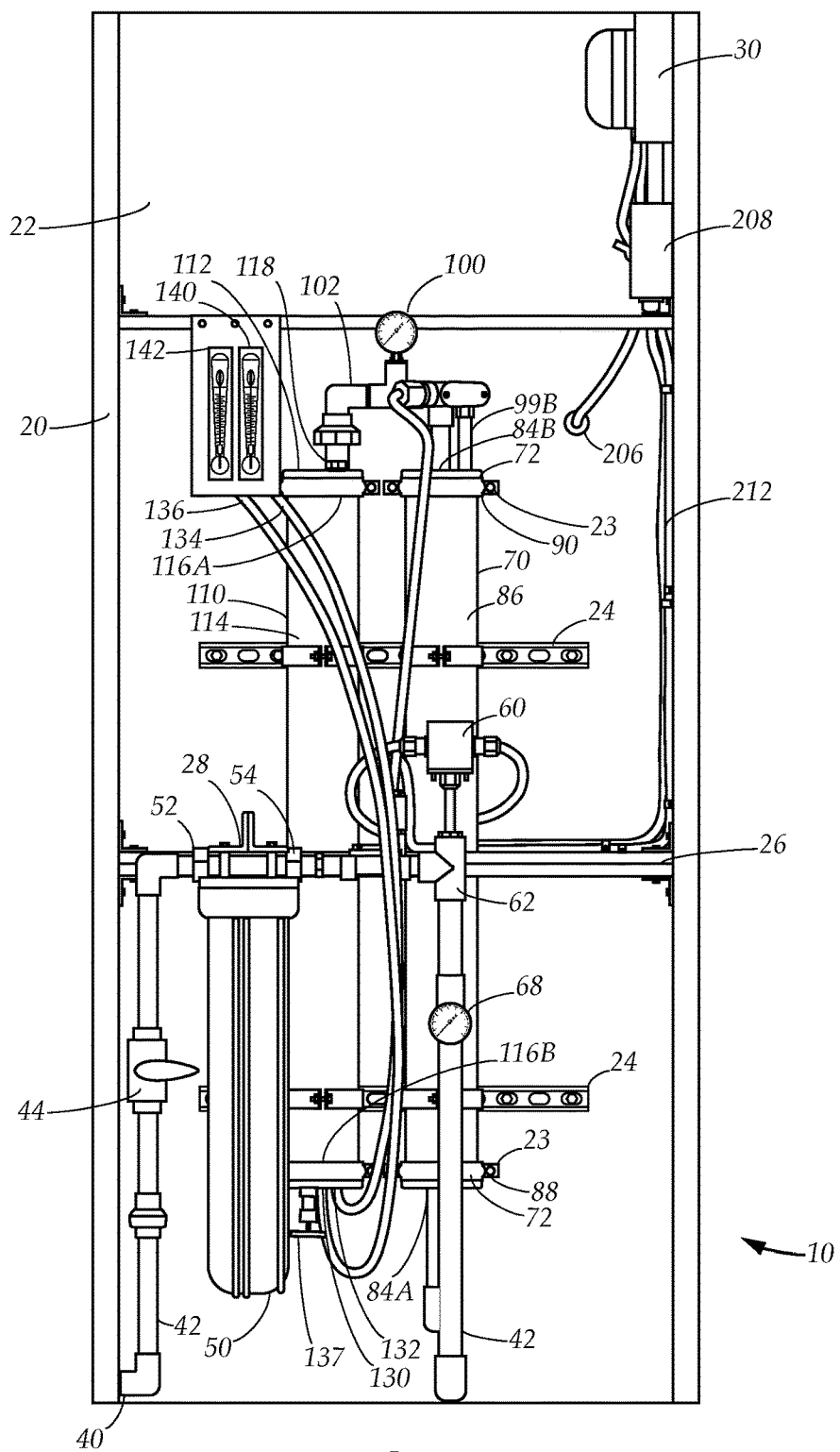
FIG. 3 is a diagrammatical front view of an embodiment of a pump assisted water filtration system configured within a mounting cabinet, in accordance with the present disclosure.

FIG. 3 depicts an exemplary pump assisted water filtration system 10 according to an embodiment of the present disclosure. The reverse filtration system 10 can be configured within a cabinet 20 comprising a plurality of support walls 22. The elements of the pump assisted water filtration system 10 can be attached to the support walls 22 using brackets. For example, the pump assembly housing 86 can be attached to the support wall 22 using one or more housing brackets 24 configured to anchor the pump assembly housing 86 to the support wall 22, and a cap bracket 23 configured to grip the pump assembly cap 72 and secure it to the support wall 22. The filter assembly 110 may be similarly mounted to the support wall 22 using the housing brackets 24. The housing and cap brackets 23, 24 can be employed individually or as a combination. The cabinet 20 may further comprise a lateral support bar 26 which is anchored between two opposite support walls 22. The lateral support bar 26 provides an additional mounting point for the components of the pump assisted water filtration system 10 and can be employed in combination with the cap bracket 23 and the mounting bracket 24 to support particularly heavy components. In one embodiment, the first filter 50 can be secured to the lateral support bar 26 using a mounting plate 28. The main power switch 208 can be mounted on one of the support walls 22, and the electrical wiring 212 can be attached to the support walls 22 as the electrical wiring 212 is routed around the cabinet 20 to connect the various components of the pump assisted water filtration system 10. The pump assisted water filtration system may further have a control box 30 for housing a wiring junction or electrical components necessary for the operation of the system control circuit 200 shown in FIG. 2, and the control box 30 may be mounted within the cabinet 10, such as on one of the support walls 22.

The water inlet 40 may be disposed through an opening in one of the support walls 22, where it is attached to the inlet conduit 42. An inlet valve 44 may be placed along the inlet conduit 42 upstream of the first filter, such that the flow of water from the water inlet 40 can be stopped by engaging the inlet valve 44. The inlet conduit 42, the pump assembly discharge conduit 102, the filtered water conduit 134, and the waste water conduit 136 may be formed using one or more segments of pipe or hose, where each segment can be flexible or rigid depending on the function of the particular conduit. The segments can be formed from stainless steel, PVC, brass, rubber, or other suitable material as can be appreciated by a person of ordinary skill in the art in the field of the invention. An inlet pressure gauge 68 may be positioned along the inlet conduit upstream of the pump assembly 70 to display the pressure of the water flowing into the pump assembly 70. A boosted pressure gauge 100 may be positioned along the pump assembly discharge conduit 102 to display the pressure of the water exiting the pump assembly 70 and entering the filter assembly 110.

Note that this example is non-limiting, and the pump assisted water filtration system 10 can be configured without a cabinet 20. For example, the pump assisted water filtration system 10 can be mounted to any suitable vertical surface, such as a wall within a building, or can be configured so that the components are positioned on a horizontal surface, such as a floor.

Figure 4A:
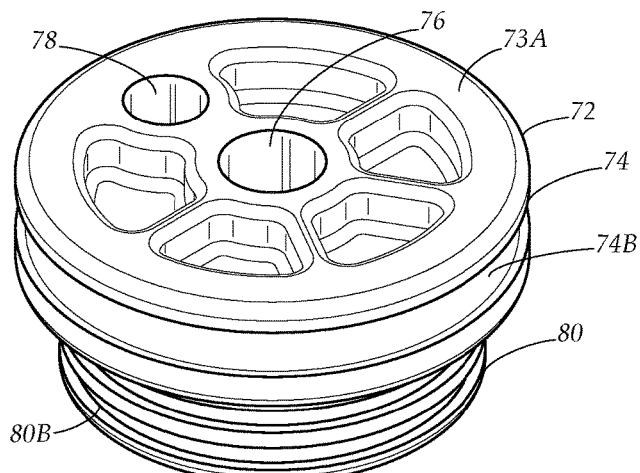
FIG. 4A and FIG. 4B are diagrammatical perspective views of an exemplary pump assembly cap configured within an embodiment in the present disclosure.
Figure 4B:
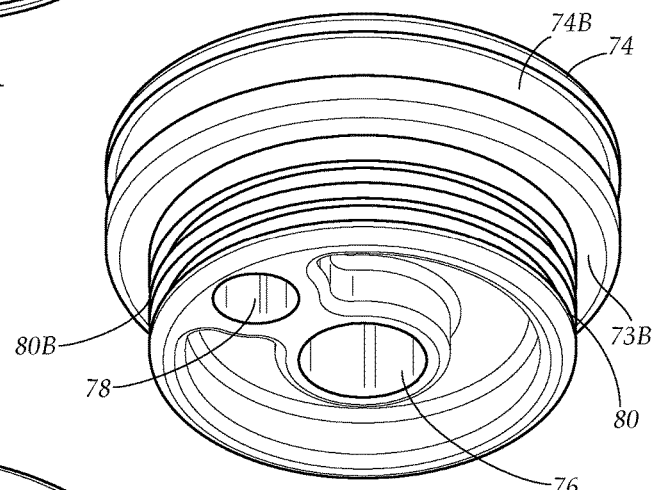
Figure 4C:
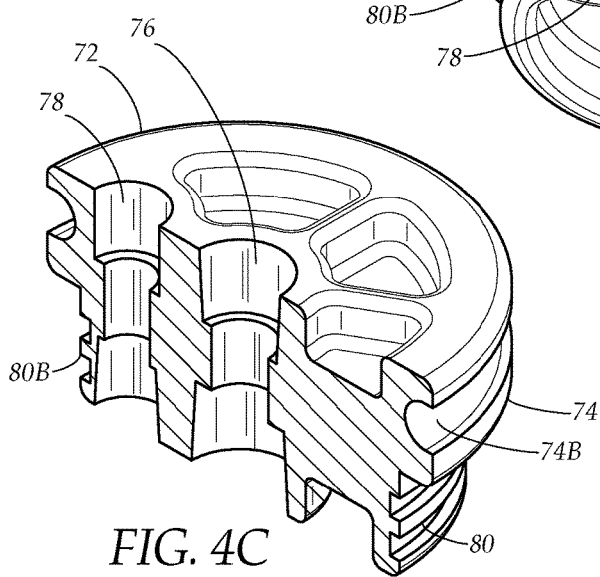
FIG. 4C is a diagrammatic perspective view of the pump assembly cap, with parts broken away along a longitudinal plane running through the center of the pump assembly cap.

Turning now to FIGS. 4A-C, the pump assembly cap 72 can be configured in the shape of a disc having a pump assembly cap outer surface 73A, a pump assembly cap inner surface 73B, and a pump assembly cap edge 74 corresponding to the circumference of the disc. The pump assembly cap 72 has at least one channel passing axially through the cap. The pump assembly cap may have a central channel 76 passing axially through the center of the cap, and may further have a secondary channel 78 passing axially through the disc at a point offset from the center. The pump assembly cap 72 may also have a pump assembly cap retaining groove 74B disposed as a depression running along the pump assembly cap edge 74. Referring to FIGS. 3 and 4A-B simultaneously, the cap bracket 23 may be configured to clamp around the pump assembly cap 72 via the pump assembly cap retaining groove 74. The pump assembly cap 72 may further have a pump assembly cap seal 80 configured as a cylindrical projection extending away from the pump assembly cap inner surface 73B, where the pump assembly cap seal 80 has a diameter smaller than the diameter of the pump assembly cap 72. Referring to FIGS. 3 and 4A-C simultaneously, the pump assembly cap 72 can be configured to seal the pump assembly housing upstream or downstream ends 88, 90 such that the pump assembly cap seal 80 fits within the tube to form a watertight seal. The pump assembly housing upstream and downstream ends 88, 90 may be configured with threaded openings, allowing the pump assembly cap seal 80 to securely couple with the pump assembly housing upstream and downstream ends 88, 90 by means of a thread 80B disposed around the pump assembly cap seal.

Continuing to refer to FIGS. 3 and 4A-C, when the pump assembly cap 72 is placed at the pump assembly housing upstream end 88, either the central channel 76 or secondary channel 78 may be configured as the pump assembly inlet 84A to which the inlet conduit 42 is connected. Similarly, when the pump assembly cap 72 is placed at the pump assembly downstream end 90, either the central channel 76 or the secondary channel 78 may be configured as the pump assembly outlet 84B to which the pump assembly discharge conduit 102 is connected. Where the pump assembly cap 72 is configured with both the central channel 76 and secondary channel 78, but one of the channels is unused, the unused channel may be sealed by means of a stopper.

Figure 5:
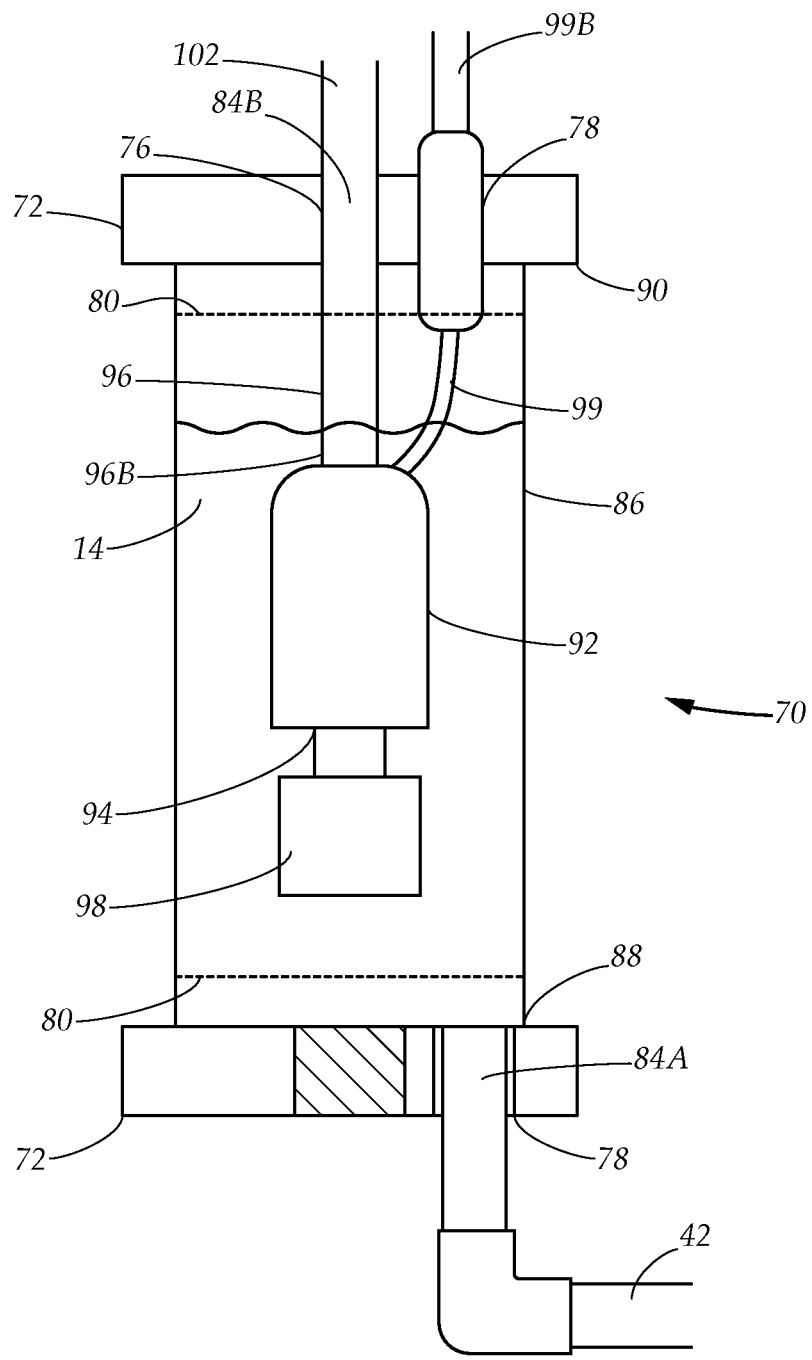
FIG. 5 is a diagrammatical side view of an exemplary pump assembly, with parts broken away, showing a pump and a motor configured within a pump assembly housing.

Turning now to FIG. 5, an exemplary pump assembly 70 is shown where the pump assembly housing 86 encloses the pump 92 and motor 98. Water 14 from the inlet conduit 42 flows through the pump assembly inlet 84A and into the pump assembly housing 86. The motor 98 is configured to power a pumping mechanism within the pump 92, such as an impeller or similar mechanism, and receives electrical current from a motor electrical wire 99. The pump 92 is configured to draw water into the pump 92 via a pump inlet 94. The pump 92 then expels the water out of the pump and through the pump outlet 96, where the water then passes through the pump assembly outlet 84B and into the pump assembly discharge conduit 102.

The pump assembly housing upstream end 88 and pump assembly housing downstream end 90 can be sealed using pump assembly caps 72. In the present example, the secondary channel 78 of the pump assembly cap 72 disposed downstream is configured to accept a motor wire conduit 99B, which may be implemented as a tube or other apparatus which allows the motor electrical wire 99 to pass through the secondary channel 78, while also forming a watertight seal with the secondary channel 78 to prevent water from escaping. The central channel 76 of the pump assembly cap 72 disposed downstream is configured as the pump assembly outlet 84B, which is further connected to the pump outlet 96. The pump outlet 96 can be a rigid pump discharge pipe 96B, thus serving as a structural element which allows the pump assembly cap to hold the pump 92 in a fixed position inside the pump assembly housing 86.

The pump 92 and motor 98 may be implemented using any pump and motor combination capable of fitting within the pump assembly housing 86 and operating while submerged in the water when the pump assembly housing 86 is filled with water. The pump assembly housing 86 may, for example, be made from stainless steel tubing 4 inches in diameter and 40 inches in length. The pump assembly housing 86 can be formed using other materials, such as PVC, fiberglass, or other suitable materials as will be apparent to a person of ordinary skill in the art in the field of the invention. The size of the pump assembly housing 86, as well as the size of the pump assembly caps 72, may be increased or decreased in proportion with the desired production capacity of the pump assisted water filtration system, with a larger pump assembly housing 86 capable of containing more water and a more powerful pump 92 and motor 98 to produce a larger flow of pressurized water or water at higher pressure.

Figure 6:
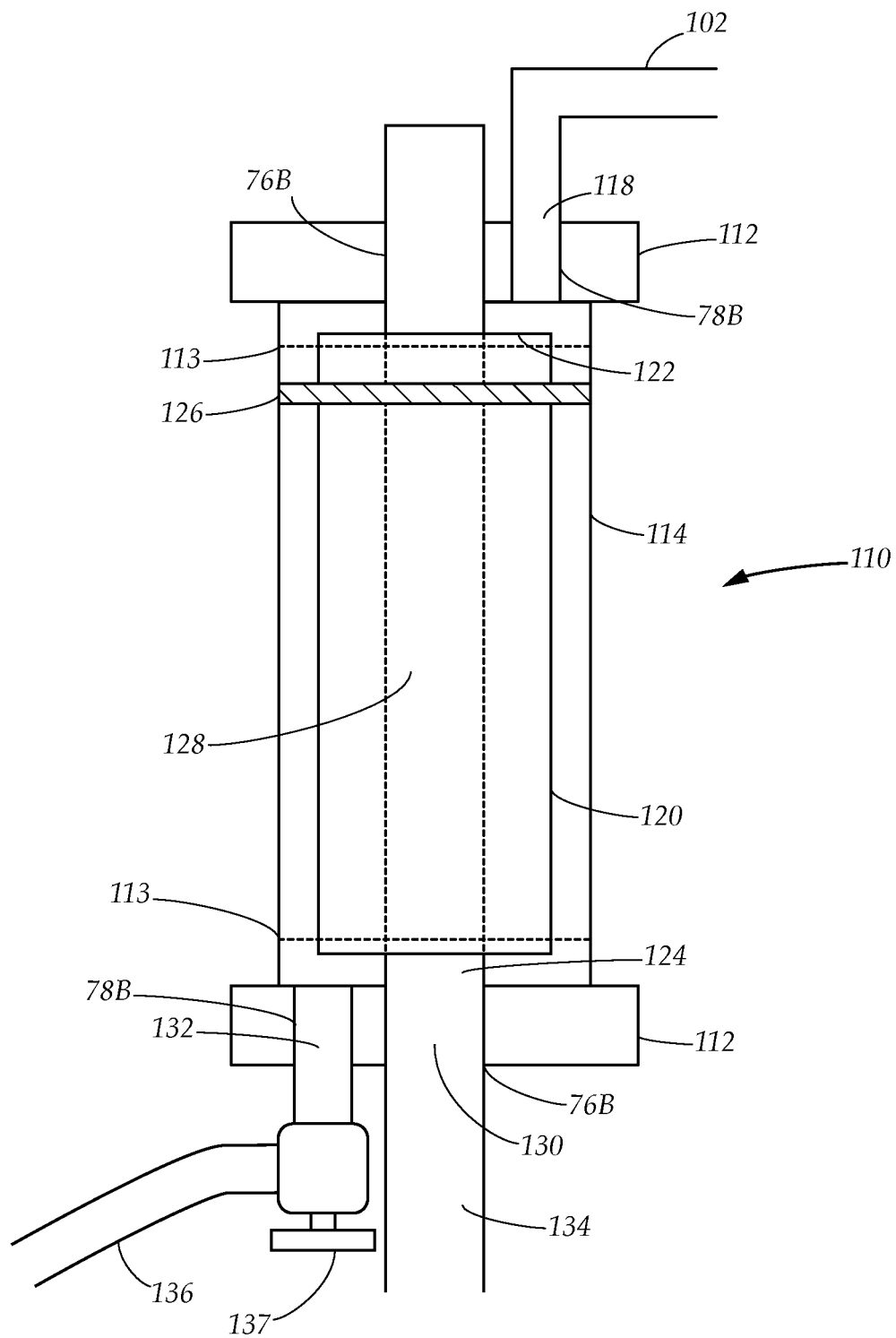
FIG. 6 is a diagrammatical side view of an exemplary filter assembly showing a membrane filter configured within a filter assembly housing.

Referring to FIGS. 3 and 6 simultaneously, the filter assembly 110 can be configured such that the filter assembly housing 114 takes the form of a tube, which can be made of stainless steel, PVC, fiberglass, or other suitable material as will be apparent to a person of ordinary skill in the art in the field of the invention. The filter assembly housing upstream end 116A and filter assembly housing downstream end 116B can be sealed using a filter assembly cap 112. Referring simultaneously to FIGS. 3, 4A-C, and 6, the filter assembly cap can be configured in substantially the same manner as the pump assembly cap 72, and may have a filter assembly cap central channel 76B, a filter assembly cap secondary channel 78B, and a filter assembly cap seal 113, which have features substantially similar to the central channel 76, secondary channel 78, and pump assembly cap seal 80 respectively. The filter assembly cap may also be configured with a retaining groove similar to the pump assembly cap retaining groove 74B. The filter assembly cap secondary channel 78B of the filter assembly cap 112 disposed at the filter assembly housing upstream end 116A can be configured as the filter assembly inlet 118 which connects to the pump assembly discharge conduit 102. The filter assembly cap central channel 76B of the filter assembly cap 112 disposed at the filter assembly housing downstream end 116B can be configured as the filter assembly water outlet 130 which connects to the filtered water conduit 134, while the filter assembly cap secondary channel 78B of the same filter assembly cap 112 can be configured as the filter assembly waste outlet 132 which connects to the waste water conduit 136. As with the pump assembly, the filter assembly housing upstream and downstream ends 116A, 116B may be configured with threaded openings to allow the filter assembly cap 112 to securely couple with the filter assembly housing upstream and downstream ends 116A, 116B by means of threaded sealing means disposed on the filter assembly cap seal 113. The membrane filter 120 can be disposed within the filter assembly housing 114, where the membrane filter 120 has a membrane filter inlet 122 oriented towards the filter assembly housing upstream end 116A and a membrane filter outlet 124 oriented towards the filter assembly housing downstream end 116B. The membrane filter 120 can further be configured with a membrane filter seal 126 which prevents the water from flowing around and bypassing the membrane filter 120 within the filter assembly housing 114, such as a gasket disposed around the membrane filter 120 which forms a seal between the membrane filter 120 and the filter assembly housing 114.

Water from the pump assembly discharge conduit 102 flows through the filter assembly inlet 118 and into the filter assembly housing 114. The water then passes through the membrane filter inlet 122 and into the membrane filter 120, where the impurities within the water are excluded by the membrane filter, and then exits the membrane filter 120 through the membrane filter outlet 124. The membrane filter 120 may have a central pipe 128 with a central pipe downstream end, where the central pipe downstream end serves as the membrane filter outlet 124. The central pipe 128 collects the purified water passing through the membrane layers of the membrane filter and transports the purified water through the membrane filter outlet 124 and the filter assembly water outlet 130. Impurities excluded by the membrane filter 120 do not enter the central pipe 128, but are instead flushed out of the membrane filter 120 by the waste water. The waste water does not pass through the filter assembly water outlet 130, but instead passes through the filter assembly waste outlet 132 to the waste water conduit 136. The drain valve 137 may be positioned along the waste water conduit 136 or at the filter assembly waste outlet 132 in order to control the flow of waste water through the waste water conduit 136 in relation to the flow of purified water through the filtered water conduit 134.

The dimensions of the filter assembly housing 114 can be increased or decreased in proportion with the desired production capacity of purified water by the pump assisted water filtration system. The filter assembly housing 114 may, for example, have a diameter of four inches and a length of forty inches to accommodate a membrane filter 114 of substantially the same dimensions. The size of the filter assembly housing 114, along with the size of the filter assembly caps 112, can be increased to accommodate larger membrane filters. The filter assembly 110 can be further adapted to accommodate more than one membrane filter 120 operating in series by lengthening the filter assembly housing 114. Furthermore, it will be apparent to a person of ordinary skill in the art in the field of the invention that the filter 110 assembly may be configured to operate with filters other than reverse osmosis membrane filters, while otherwise adhering to the principles of the present disclosure.

The filter assembly 110 can be placed in a vertical configuration, where the filter assembly housing upstream end 116A is oriented upwardly. This allows gravity to assist in the downward flow of water through the membrane filter 120.

Referring simultaneously to FIGS. 1 and 5-6, the pump assembly 70 can be configured so that water can pass through the pump assembly 70 even if the pump 92 is inactive. The pump 92 and pump mechanism may be configured so that water under sufficient pressure can pass into the pump inlet 94, though the pump mechanism, such as by turning or flowing around the pump mechanism, and through the pump outlet 96 even when the pump is inactive. The water source 12 may provide water 14 to the pump assisted water filtration system 10 at pressures suitable for use with the membrane filter 120. For example, municipal water sources may have a static pressure of approximately 60 psi, and certain commercially available membrane filters can operate at a pressure of 45 psi or lower. Water 14 may therefore pass through the pump assembly 70 while the pump 92 remains inactive, to reach the filter assembly 110 at a pressure of 60 psi, where the membrane filter 120 within the filter assembly 110 is configured to operate at low pressure. Therefore, the use of a low-pressure membrane filter 110 allows the pump assisted water filtration system to produce properly purified water 14B even if the pump 92 remains inactive, such as in the event of a pump failure.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a pump-assisted water filtration system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A pump assisted water filtration system, comprising:
an inlet conduit configured to transport water from a water source;
a pump assembly having a tube-shaped pump assembly housing, the pump assembly housing having a pump assembly housing upstream end and a first pump assembly cap which covers the pump assembly housing upstream end, the first pump assembly cap has a first pump assembly cap channel which passes through the first pump assembly cap and functions as a pump assembly inlet, the pump assembly housing further having a pump assembly housing downstream end and a second pump assembly cap which covers the pump assembly housing downstream end, the second pump assembly cap has a second pump assembly cap central channel which passes through the second pump assembly cap and functions as a pump assembly outlet, the pump assembly inlet is connected to the inlet conduit, the pump assembly further comprising a pump with a pump inlet, a pumping mechanism, a motor configured to power the pumping mechanism, and a pump discharge pipe which is connected to the pump assembly outlet, the pump, pumping mechanism, and motor are disposed within the pump assembly housing between the first pump assembly cap and the second pump assembly cap, the pump discharge pipe is arranged co-axially with the pump and the motor and supports and holds the pump and motor in a position located centrally within the pump assembly housing, such that activation of the pump causes the water flowing into the pump assembly housing via the pump assembly inlet to be drawn into the pump inlet and impelled through the pump discharge pipe and the pump assembly outlet by the motor, the second pump assembly cap further having a second pump assembly cap secondary channel passing through the second pump assembly cap, and the pump assembly further comprises a motor electrical conduit passing through the second pump assembly cap secondary channel which delivers power to the motor via a motor electrical wire passing through the motor electrical conduit, the pump assembly is further configured to allow the water flowing into the pump assembly to pass through the pump inlet, the pumping mechanism, and into the pump discharge pipe when the pump is inactive;
a first filter disposed along the inlet conduit between the water source and the pump assembly, and where the first filter is configured to filter out particulate matter within the water flowing through the inlet conduit;
a vertically arranged filter assembly comprising a tube-shaped filter assembly housing having an upwardly oriented filter assembly housing upstream end and a first filter assembly cap which covers the filter assembly housing upstream end, the first filter assembly cap has a first filter assembly cap channel which passes through the first filter assembly cap and functions as a filter assembly inlet, the filter assembly housing further having a downwardly oriented filter assembly housing downstream end and a second filter assembly cap which covers the filter assembly housing downstream end, the second filter assembly cap has a second filter assembly cap central channel which passes through the second filter assembly cap and functions as a filter assembly water outlet, where the water flowing from the pump assembly is transported to the filter assembly via a pump discharge conduit connected to the filter assembly inlet, where the filter assembly further comprises a membrane filter which is disposed between the first filter assembly cap and the second filter assembly cap, the membrane filter is configured to filter impurities within the water flowing downwardly into the filter assembly via the filter assembly inlet using a reverse osmosis process, causing purified water to flow out of the filter assembly through the filter assembly water outlet, the second filter assembly cap further has a second filter assembly cap secondary channel which passes through the second filter assembly cap and functions as a filter assembly waste outlet, the filter assembly further has a waste water conduit connected to the filter assembly waste outlet, wherein the impurities filtered by the membrane filter are flushed out of the filter assembly via the filter assembly waste outlet by a flow of waste water, and the waste water is transported from the filter assembly waste outlet via the waste water conduit;
a filtered water conduit connected to the filter assembly water outlet, where the filtered water conduit is configured to transport the purified water to a filtered water outlet;
a drain valve configured to regulate the proportion of the waste water flowing out of the filter assembly in relation to the purified water flowing out of the filter assembly by increasing or decreasing back pressure within the waste water conduit;
a water storage tank configured to store the purified water via the filtered water outlet, where the water storage tank is further configured with a tank level control switch which detects the rise and fall of a water level within the storage tank, wherein the tank level control switch is configured as a float switch which engages when the water level within the water storage tank falls, and disengages when the water level within the water storage tank is full;
a water interrupt valve disposed along the inlet conduit upstream of the pump assembly, where the water interrupt valve is configured to be set to an open state or a closed state, where the water interrupt valve stops the flow of water to the pump assembly when set to the closed state, and allows the flow of water to the pump assembly when set to the open state, where the water interrupt valve is operably connected to the tank level control switch, wherein the tank level control switch engages to set the water interrupt valve to the closed state when the water storage tank is full and disengages to set the water interrupt valve to the open state when the water level within water storage tank falls;
a pressure switch configured to monitor the pressure of the water flowing from the inlet conduit to the pump assembly, where the pressure switch is further configured to activate the pump when the pressure of the water within the inlet conduit reaches a pump activation threshold and deactivate the pump when the pressure of the water within the inlet conduit falls below the pump activation threshold;

a filtered water flow gauge disposed on the filter assembly water outlet, a waste water flow gauge disposed on the filter assembly waste outlet; and a cabinet having at least one mounting wall, wherein the first and second pump assembly caps and first and second filter assembly caps are each substantially disc shaped, and each have a circumference and a cap retaining groove disposed around the circumference, wherein the filter assembly and pump assembly are each secured to the at least one mounting wall by a plurality of cap brackets configured to grip the cap retaining grooves configured in the first and second filter assembly caps and the first and second pump assembly caps.

2. A pump assisted water filtration system, comprising:

an inlet conduit configured to transport water from a water source;

a pump assembly having a pump assembly housing having a pump assembly housing upstream end and a first pump assembly cap which covers the pump assembly housing upstream end, the first pump assembly cap is configured with a pump assembly inlet, the pump assembly housing further has a pump assembly housing downstream end and a second pump assembly cap which covers the pump assembly downstream end, the second pump assembly cap is configured with a pump assembly outlet, the pump assembly inlet is connected to the inlet conduit, the pump assembly further comprising a pump with a pump inlet, a pumping mechanism, a motor configured to power the pumping mechanism, and a pump discharge pipe which is connected to the pump assembly outlet, the pump, pumping mechanism, and motor are disposed within the pump assembly housing, the pump discharge pipe is arranged co-axially with the pump and the motor and supports and holds the pump and motor in a position located centrally within the pump assembly housing, such that activation of the pump causes the water flowing into the pump assembly housing via the pump assembly inlet to be drawn into the pump inlet and impelled through the pump discharge pipe and the pump assembly outlet by the motor, the pump assembly is configured to allow the water flowing into the pump assembly to pass through the pump inlet, the pumping mechanism, and into the pump discharge pipe when the pump is inactive;

a first filter disposed along the inlet conduit between the water source and the pump assembly, and where the first filter is configured to filter out particulate matter within the water flowing through the inlet conduit;

a filter assembly comprising a filter assembly housing having a filter assembly housing upstream end and a first filter assembly cap which covers the first assembly housing upstream end, the first filter assembly cap is configured with a filter assembly inlet, the filter assembly housing further having a filter assembly housing downstream end and a second filter assembly cap which covers the filter assembly housing downstream end, the second filter assembly cap is configured with a filter assembly water outlet, where the water flowing from the pump assembly is transported to the filter assembly via a pump discharge conduit connected to the filter assembly inlet, where the filter assembly further comprises a membrane filter configured to filter impurities within the water flowing into the filter assembly via the filter assembly inlet using a reverse osmosis process, causing purified water to flow out of the filter assembly through the filter assembly water outlet, the second filter assembly cap further has a filter assembly waste outlet, the filter assembly further has a waste water conduit connected to the filter assembly waste outlet, wherein the impurities filtered by the membrane filter are flushed out of the filter assembly via the filter assembly waste outlet by a flow of waste water, and the waste water is transported from the filter assembly waste outlet via the waste water conduit;

a filtered water conduit connected to the filter assembly water outlet, wherein the filtered water conduit is configured to transport the purified water to a filtered water outlet;

a water consumption point connected to the filtered water outlet, wherein the purified water is consumed;

a water interrupt valve disposed along the inlet conduit upstream of the pump assembly, wherein the water interrupt valve is configured to be set to an open state or a closed state, wherein the water interrupt valve stops the flow of water to the pump assembly when set to the closed state, and allows the flow of water to the pump assembly when set to the open state, where the water interrupt valve is operably connected to a flow control switch, wherein the flow control switch engages to set the water interrupt valve to the open state and disengages to set the water interrupt valve to the closed state;

a pressure switch configured to monitor the pressure of the water flowing from the inlet conduit to the pump assembly, where the pressure switch is further configured to activate the pump when the pressure of the water within the inlet conduit reaches a pump activation threshold and deactivate the pump when the pressure of the water within the inlet conduit falls below the pump activation threshold;

a filtered water flow gauge disposed on the filter assembly water outlet, a waste water flow gauge disposed on the filter assembly waste outlet, and a drain valve configured to proportionally regulate the waste water flowing out of the filter assembly in relation to the purified water flowing out of the filter assembly by increasing or decreasing back pressure within the waste water conduit; and a cabinet having at least one mounting wall, wherein the first and second pump assembly caps and first and second filter assembly caps are each substantially disc shaped, and each have a circumference and a cap retaining groove disposed around the circumference, wherein the filter assembly and pump assembly are each secured to the at least one mounting wall by a plurality of cap brackets configured to grip the cap retaining grooves configured in the first and second filter assembly caps and the first and second pump assembly caps.

* * * * *